United States Patent [19]

Anderson

[11] Patent Number: 5,995,603
[45] Date of Patent: Nov. 30, 1999

[54] TELEPHONE CALL SCREENING DEVICE

[75] Inventor: W. Thomas Anderson, Brick, N.J.

[73] Assignee: AT&T Corp, New York, N.Y.

[21] Appl. No.: 08/862,463

[22] Filed: May 23, 1997

[51] Int. Cl.$^6$ .................................................. H04M 1/56
[52] U.S. Cl. ............................ 379/142; 379/373; 379/375
[58] Field of Search ...................................... 379/142, 373, 379/374, 375

[56] References Cited

U.S. PATENT DOCUMENTS

| | | | |
|---|---|---|---|
| 5,347,574 | 9/1994 | Morganstein | 379/142 |
| 5,351,289 | 9/1994 | Logsdon et al. | 379/142 |
| 5,602,908 | 2/1997 | Fan | 379/142 X |

Primary Examiner—Creighton Smith

[57] ABSTRACT

A device is provided for screening incoming telephone calls. A list of authorized callers' telephone numbers is maintained in the device. Incoming telephone calls are detected and caller identification information (i.e., the originating telephone number of the call) is extracted. The caller identification information is compared with the authorized caller list. If the caller identification information for the incoming call is in the list, the telephone is allowed to ring normally. If the caller identification information for the incoming call is not in the list the telephone is prevented from ringing normally. The telephone can be prevented from ringing normally by answering the unauthorized call, by generating a distinctive ring for the call, or by redirecting the call to a separate telephone or to an answering machine.

20 Claims, 4 Drawing Sheets

TELEPHONE CALL SCREENING DEVICE

FIELD OF THE INVENTION

This invention relates to screening incoming telephone calls. More particularly, this invention relates to methods and apparatus for allowing a called party's telephone to ring normally when caller identification information for an incoming call matches information in an authorized caller list, but preventing the telephone from ringing normally when the caller identification information does not match information in the authorized caller list.

BACKGROUND OF THE INVENTION

Unwanted telephone calls to the home or to one's place of business can be intrusive. As a result, many telephone customers use unlisted numbers to avoid having their telephone numbers too widely available to telemarketers and other parties who might disturb the customer with an unwanted call. Nevertheless, if the customer divulges their unlisted telephone number, there is always the possibility that unwanted callers will obtain the number and will therefore be able to call the customer.

Caller identification (ID) is a presently available service that many customers use to screen telephone calls. Telephone calls today are generally accompanied by caller identification information that identifies the telephone number of the calling party. The caller identification information is passed through the telephone network with the telephone call. The recipient of the telephone call can use caller identification equipment to extract the caller identification information (i.e., the calling party's telephone number) and display this information before the call is answered. If the called party does not wish to answer a telephone call placed from a particular telephone number, the called party can simply refrain from answering the call. If, however, the called party recognizes a caller identification number as belonging to a friend or family member, the called party is free to answer the telephone.

The caller identification service is satisfactory in many respects. However, the called party must remember the telephone number of each party from whom the called party wishes to receive a telephone call. If many telephone numbers are involved, it may be burdensome to remember all of the numbers. In addition, a separate piece of caller identification equipment must be provided for each telephone, which may be an undesirable requirement in homes with more than one or two telephones.

It is therefore an object of the present invention to provide an improved arrangement for screening incoming telephone calls.

SUMMARY OF THE INVENTION

This and other objects of the invention are accomplished in accordance with the principles of the present invention by providing methods and apparatus for screening incoming telephone calls. The call screening device of the present invention is preferably a fairly portable device having answering machine and telephone capabilities. If desired, the device can be provided in a dedicated telephone answering machine arrangement. Alternatively, a computer-based or a stand-alone arrangement may be used.

The device maintains a list of the telephone numbers of authorized callers (e.g., the telephone numbers of the user's friends and family members). When an incoming telephone call is detected, the caller identification information (i.e., the originating telephone number) for the call is extracted by the device. The caller identification information is compared with the authorized caller list. If the caller identification information for the incoming call is in the list, the telephone is allowed to ring normally (i.e., with its usual desired ring). If the caller identification information for the incoming call is not in the list, the telephone is prevented from ringing normally. If a user has a telephone service that allows incoming telephone calls to different telephone numbers to be assigned distinctive ring patterns, the device can handle incoming telephone calls based on a comparison of the caller identification information of the incoming call with separate authorized caller lists for each distinctive ring pattern.

Various actions can be taken to prevent the telephone from ringing normally. For example, the telephone can be provided with a distinctive ring, so that the user is alerted that an unauthorized caller is calling. Alternatively, answering machine circuitry in the device may be used to answer the call. Another option involves redirecting the incoming call to an alternate phone line when the call is unauthorized. The alternate phone line may be connected to an answering machine for answering the call or to a telephone that the user knows is reserved for receiving unauthorized calls.

A user can add or delete telephone numbers from the authorized caller list. For example, the user can press an add or delete key during an incoming telephone call to add or delete the current telephone number. The user can also manually add or delete a number.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
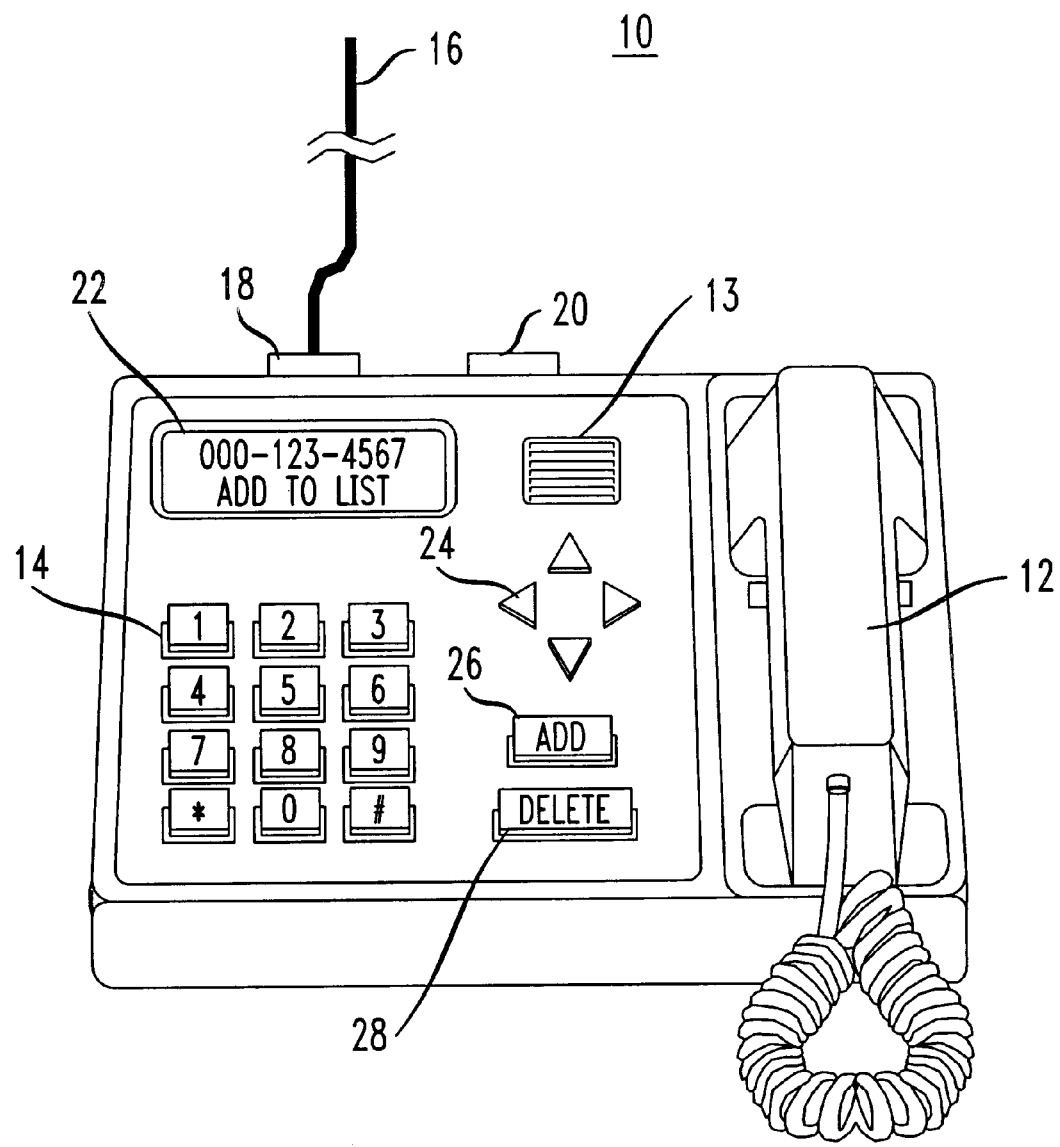
FIG. 1 is a perspective view of an illustrative call screening device in accordance with the present invention.

An illustrative call screening device 10 in accordance with the present invention is shown in FIG. 1 Device 10 preferably provides the functions of a standard telephone using telephone handset 12 and numeric keypad 14. Device 10 is connected to a standard telephone line 16 via input jack 18. A courtesy output jack 20 may be provided if desired, to a standard telephone line 16 via input jack 18. A allow attachment of a facsimile machine or other telephone line equipment.

Display 22 is preferably sufficiently large to display both caller identification information for a calling party and brief text messages generated by device 10. If available, alphanumeric information such as the names of the callers for certain telephone numbers can also be displayed.

Device 10 maintains a list of the caller identification information for authorized callers. As defined herein, the term "caller identification information" refers to any information transmitted with a telephone call through the telephone network that identifies the telephone number from which the calling party is calling. The caller identification information is generally the telephone number of the calling party. Cursor keys 24 allow the user of device 10 to scroll up or down through lists of information such as the authorized caller list using display 22. Cursor keys 24 also allow the user to advance or backspace within an entry. Add key 26 allows the user to add a desired telephone number to the list of authorized callers. Delete key 28 allows the user to delete numbers from the authorized caller list.

When the caller identification information of an incoming call matches a telephone number in the authorized caller list, device 10 rings normally through speaker 13. When the caller identification information for an incoming call is not in the authorized caller list, the answering machine functions of device 10 may be used to answer the call or a distinctive telephone call ring may be provided via speaker 13. If the call is answered by device 10, the message being left by the calling party is preferably played in real time through speaker 13, so the user can screen the incoming call.

Figure 2:
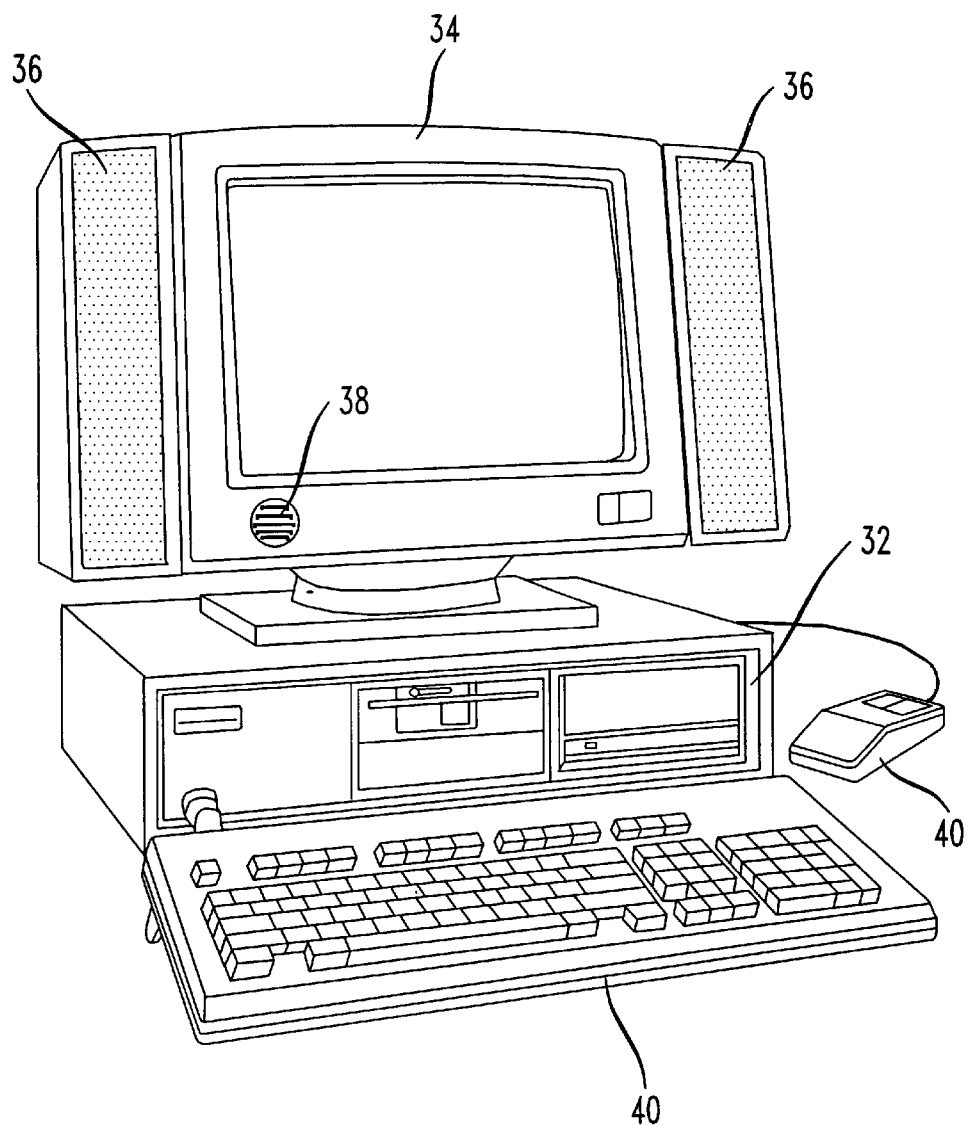
FIG. 2 is perspective view of an illustrative device based on a personal computer in accordance with the present invention.

If desired, some of the functions of device 10 can be provided by separate components. For example, telephone handset 12 may be provided on a standard telephone connected to output jack 20, rather than being integrated into device 10. The functions of device 10 may also be implemented using a standard personal computer. As shown in FIG. 2, a suitable personal computer 30 has main processing unit 32 and monitor 34. Speakers 36 and microphone 38 are used to provide telephone functions. A voice modem in processing unit 32 and associated software may also be used to provide personal computer 30 with telephone functions. Software is preferably used to direct personal computer 30 to perform answering machine functions (e.g., using a hard disk in personal computer 30). User input interface functions may be provided by mouse 40 and keyboard 42 or any suitable user interface.

Figure 3:
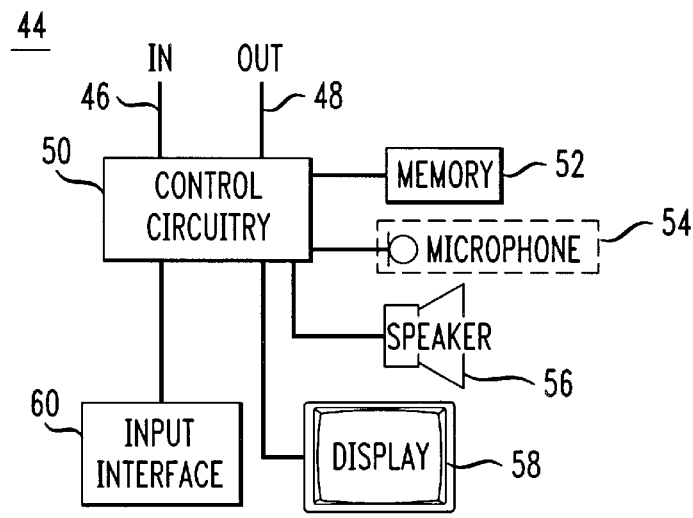
FIG. 3 is a block diagram of the circuitry of a generalized illustrative embodiment of the present invention.

FIG. 3 is a generalized block diagram applicable to both the dedicated device embodiment of FIG. 1 and the personal computer embodiment of FIG. 2. In system 44, telephone calls are received via input line 46. Output line 48 allows additional telephone equipment to be connected to system 44, if desired. Control circuitry 50 directs the operation of system 44. Control circuitry 50 may use any suitable combination of hardware and software to implement the features of the present invention. For example, control circuitry 50 may contain a microprocessor for executing instructions, may contain dedicated logic circuitry for implementing certain functions, or may contain both microprocessor circuitry and more dedicated types of logic components.

Memory 52 may be based on any suitable memory technology including random-access memory (RAM), hard disks, tape storage devices, a combination of such components, etc. Memory 52 stores instructions to be executed by control circuitry 50. Memory 52 also stores the list of authorized callers. In addition, memory 52 stores an outgoing message that is played when an incoming call is answered and stores incoming messages.

System 44 contains microphone 54 and speaker 56 to provide telephone functions. Display 58 is used to display caller identification information for incoming calls. Display 58 is also used by system 44 to display prompts for the user (e.g., "press 'add' to add this number"). The user can control the operation of system 44 and can input information into system 44 using input interface 60. Input interface 60 may be any suitable input interface, such as a keypad, keyboard, mouse, trackball, voice recognition system, wireless remote control, etc.

Figure 4:
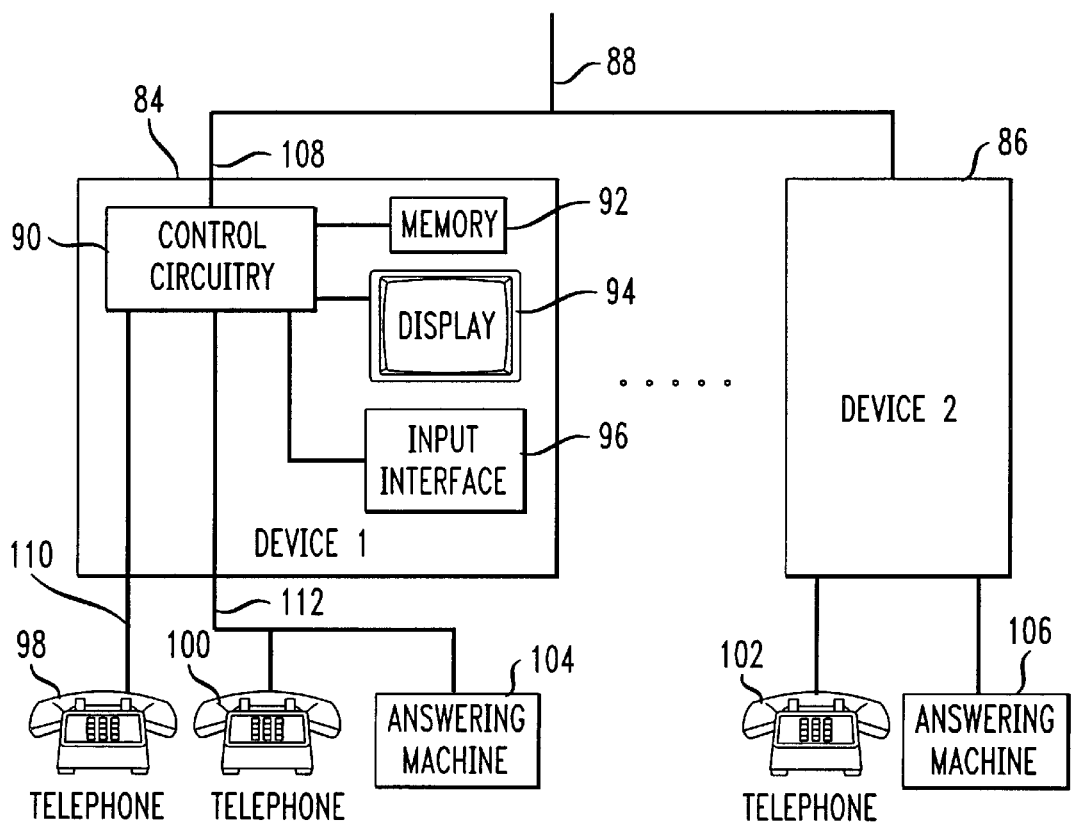
FIG. 4 is a block diagram of the circuitry of a stand-alone embodiment of the present invention.

A further illustrative embodiment of the present invention is shown in FIG. 4. In the embodiment of FIG. 4, the telephone call screening device is preferably provided in the form of stand-alone devices such as device 84 and device 86. Either a single device or multiple devices may be used. If multiple devices such as devices 84 and 86 are provided, each device may be placed in a separate room of the user's home. Incoming telephone line 84 is connected to each device in parallel.

Device 84 contains control circuitry 90 for controlling the operation of device 84. Memory 92 may be used to store instructions that are executed by control circuitry 90. Memory 92 may also be used to store a list of authorized callers. Display 94 is used to display caller identification information for incoming calls and to display messages generated by control circuitry 90. Input interface 96, which may be a keypad or any other suitable input interface, allows the user to input information into device 84. Devices such as device 84 and device 86 may be connected to standard telephone equipment, such as telephones 98, 100, 102, and answering machines 104 and 106.

The response of devices such as device 84 and device 86 to incoming telephone calls differs slightly from the response of the devices of FIGS. 1–3. In device 84, once an incoming call is detected, caller identification information is extracted by control circuitry 90 and compared to a list of authorized callers stored by the user in memory 92. If the incoming call is from an authorized caller, control circuitry 90 connects input 108 to output line 110, so that telephone 98 rings normally. If the incoming call is not from a caller whose caller identification information is in the authorized caller list, input 108 is connected to output 112. Telephone 100 therefore receives the unauthorized call and rings. Because the user knows that telephone 100 is for unauthorized calls only, the user may decline to answer the call. After a predefined number of rings (e.g., four rings), answering machine 104 will answer the unauthorized call.

If desired, the user can dispense with a second telephone such as telephone 100 and can use the arrangement shown connected to device 86. With device 86, incoming calls from authorized callers are directed to telephone 102, which is allowed to ring normally. Incoming calls from unauthorized callers are directed to answering machine 106. Because no telephone such as telephone 100 is provided in the arrangement for device 86, unauthorized calls will not result in an audible ring.

Each device such as device 84 and device 86 can be programmed with a separate list of authorized callers. For example, a parent can store a first list of authorized callers in memory 92 of device 84, which may be located in the parent's study. A child can store a second list of authorized callers in the memory of device 86, which may be located in the child's bedroom. With such an arrangement, calls to the child from the child's friends need not cause telephone 98 in the parent's study to ring, whereas calls from the parent's friends need not cause telephone 102 in the child's bedroom to ring.

Some users may have a telephone service that allows a single telephone line to be used to receive incoming telephone calls to different telephone numbers, each of which activates a distinctive ring pattern at the user's telephone. An incoming telephone call using a first number causes the user's telephone to ring with a first tone and frequency, whereas an incoming telephone call using a second number causes the same telephone to ring with a second tone and frequency. Members of the user's household or business can determine the intended recipient of the incoming call from the distinctive rings. With this type of service, device 84 can be programmed to contain two authorized caller lists—one for the first number and one for the second number. Device 84 then detects which number is being called by analyzing the pattern of the ring signal generated by the local office. Calls directed to the first number are compared to the first authorized caller list. Calls directed to the second number are compared to the second authorized caller list. When calls to the first number are authorized, the telephone can be allowed to ring with the first distinctive ring. When calls to the second number are authorized, the telephone can be allowed to ring with the second distinctive ring. Alternatively, multiple devices, such as device 84 and device 86, can each contain a separate authorized caller list (i.e., device 84 can contain an authorized caller list for the first number and distinctive ring pattern and device 86 can contain an authorized caller list for the second number and distinctive ring pattern). If the user's service permits more than two telephone numbers with distinctive rings, devices such as devices 84 and 86 can be provided with additional authorized caller lists.

Figure 5:
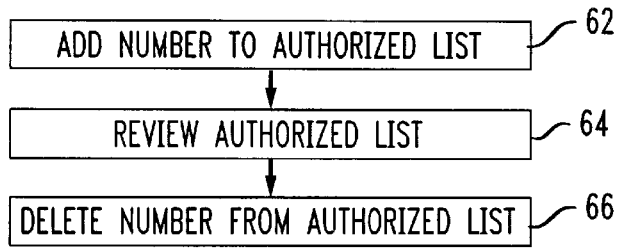
FIGS. 5 and 6 are flow charts of steps involved in the use of the present invention.

Steps involved in setting up each user's list of authorized callers are shown in FIG. 5. The order of the steps shown in FIG. 5 is not critical. In addition, although the steps of FIG. 5 may be performed using the computer equipment of FIG. 2, the more generalized arrangement shown in FIG. 3, or the devices of FIG. 4, the steps of FIG. 5 are described in connection with the use of device 10 of FIG. 1 to make the explanation easier to follow.

At step 62 of FIG. 5, the user may add a telephone number (e.g., of a friend or family member) to the authorized caller list. If an incoming call is currently being answered by device 10 or if the user is currently answering an incoming telephone call, the user can add the originating telephone number to the list by pressing add button 26. (In the embodiment shown in FIG. 4, the user can add the number by pressing an add button while device 84 is handling an incoming call.) Preferably, device 10 displays a confirmatory message, such as "press 'add' again to confirm," before the number is added to the list. Once the user presses add button 26 for a second time, device 10 takes the caller identification information for the incoming call and adds it to the authorized caller list.

If no incoming call is currently being handled, the user can press add button 26 to initiate a manual entry sequence. For example, pressing add button 26 may cause device 10 to display the prompt "*_*_**" to allow the user to add a desired number from keypad 14. If the user makes a mistake, the user can backspace using the backspace cursor key 24. Once the final digit has been entered, a prompt such as "press 'add' to add this number to the authorized caller list" may be displayed on the lower portion of display 22**.

Step 64 illustrates how the user may review the contents of the list of authorized numbers using cursor keys 24. If the first key pressed is the up cursor key 24, the last number in the authorized caller list may be displayed on display 22. If the first key pressed is the down cursor key 24, the first number in the authorized caller list may be displayed. A "type ahead" feature may be used that allows the user to view a particular portion of the list by entering the first few digits of a desired number in the list with keypad 14.

After locating a number in the authorized caller list at step 64, the user may delete that number at step 66 by pressing delete key 28. A confirmatory message such as "press 'delete' to confirm deletion of this number" may be displayed on display 22 prior to deletion. Another way in which to delete a number from the authorized list is by pressing delete key 28 while device 10 is answering a call or while the user is receiving a call from the number to be deleted. (In the embodiment of FIG. 4, the user can delete a number by pressing a delete key when device 84 is handling a call.) Device 10 may display a confirmatory message such as "press 'delete' to delete this number" prior to deleting the current number from the list. The user may then press delete key 28 to confirm deletion.

Figure 6:
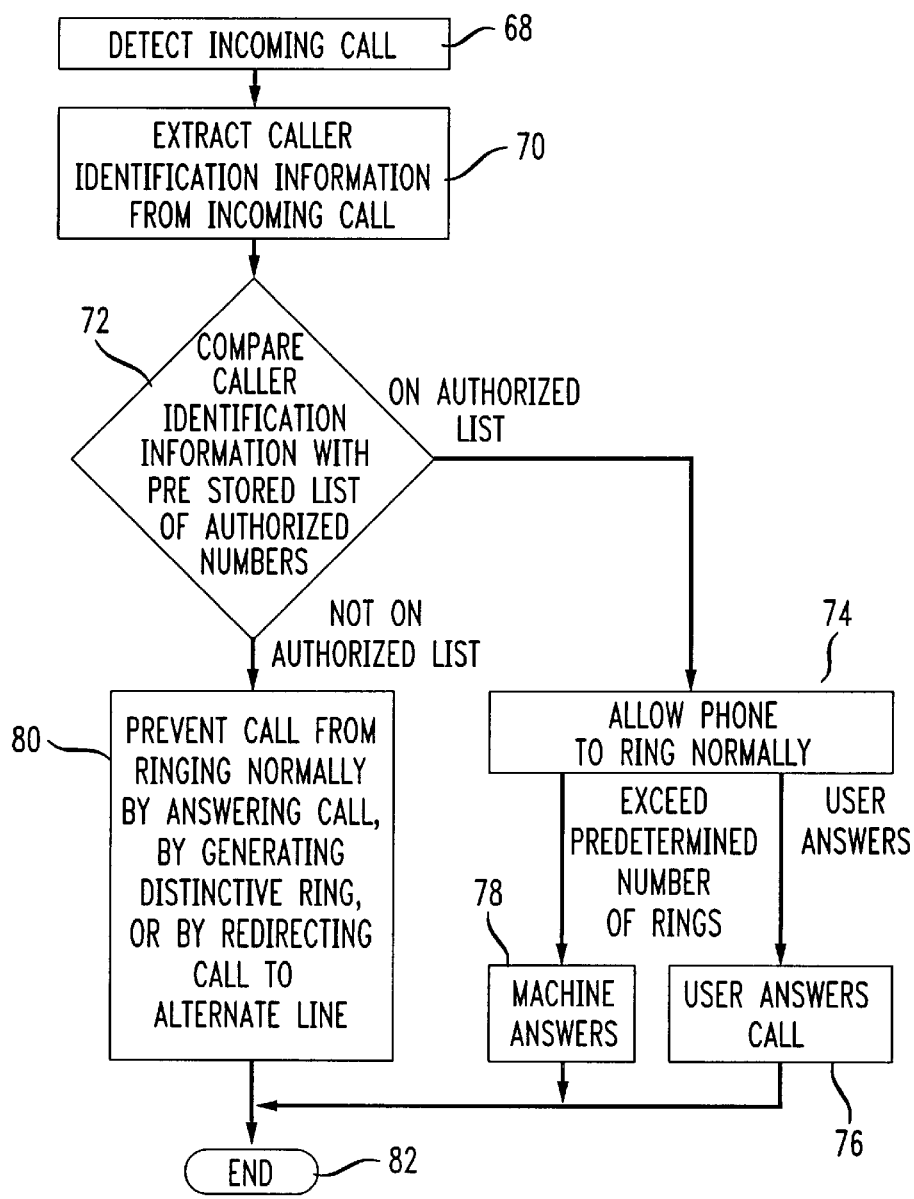

Device 10 uses the list maintained during steps 62, 64, and 66 to determine which calls are to be allowed to ring normally and which calls are to be prevented from ringing normally so that the called party can screen the call. Devices such as device 84 and device 86 also determine how to handle calls based on whether or not caller identification information for an incoming call matches information stored in the list of authorized callers. Steps involved in handling an incoming telephone call are shown in FIG. 6. Although the steps of FIG. 6 may be performed using the computer equipment of FIG. 2, the more generalized arrangement shown in FIG. 3, or the devices of FIG. 4, the steps of FIG. 6 are generally described in connection with the use of device 10 of FIG. 1 to make the explanation easier to follow.

At step 68 of FIG. 6, device 10 detects an incoming telephone call. Device 10 extracts caller identification information from the incoming telephone call at step 70 using standard techniques. If the user has a telephone service in which the local office provides incoming calls to the user with distinctive rings based on which of two or more of the user's numbers has been called, device 10 determines at step 72 which number has been called by analyzing the distinctive ring pattern of the incoming call. The identity of the called number may then be used by device 10 to determine which of two or more authorized caller lists the caller identification information is to be compared with. The extracted caller identification information is compared with the callers on the appropriate authorized caller list at step 72. If it is determined at step 72 that the caller identification information is in the authorized caller list, the telephone call is allowed to ring normally (e.g., through speaker 13) at step 74. The user may answer the call at step 76 or, if a predetermined number of rings (e.g., four rings) is exceeded, device 10 may answer the call at step 78. The call ends at step 82.

If it is determined at step 72 that the caller identification information is not in the authorized caller list, device 10 prevents the call from ringing normally at step 80. Device 10 may prevent the call from ringing normally by answering the incoming call without a significant delay, by generating a distinctive ring in place of the normal ring, or by redirecting the call to an alternate line (as shown and discussed in connection with devices 84 and 86 of FIG. 4). If device 10 answers the call, device 10 preferably plays a prestored outgoing message and uses speaker 13 to play the incoming call in real time while it is being recorded. The called party can therefore decide to either answer the call or to allow the answering machine to continue to answer the call. If device 10 generates a distinctive ring or if device 84 redirects the call to a second telephone, the called party can decide whether to answer the call knowing that the call is from an unauthorized caller. If device 84 (FIG. 4) redirects the call to answering machine 104 (FIG. 4), the called party can screen the call by listening to answering machine 104 (FIG. 4) while the caller leaves a message. The call ends at step 82.

The foregoing is merely illustrative of the principles of this invention and various modifications can be made by those skilled in the art without departing from the scope and spirit of the invention.

What is claimed is:

1. A device for screening incoming telephone calls on a telephone line based on an authorized caller list, comprising:
   means for extracting caller identification information from an incoming telephone call on the telephone line;
   means for comparing the caller identification information with the authorized caller list;
   means for allowing the incoming telephone call to ring normally when the caller identification information is contained in the authorized caller list; and
   means for allowing an alternative ringing when caller identification information is not contained in the authorized caller list.

2. The device defined in claim 1 wherein the means for having an alternative ringing further comprises means for answering the incoming telephone call.

3. The device defined in claim 1 wherein the means for having an alternative ringing further comprises means for generating a distinctive ring for the incoming telephone call.

4. The device defined in claim 1 wherein the means for having an alternative ringing further comprises means for redirecting the incoming telephone call.

5. The device defined in claim 1 further comprising means for maintaining the authorized caller list.

6. The device defined in claim 5 wherein the means for maintaining the authorized caller list comprises means for adding the caller identification information of a currently received telephone call to the list.

7. The device defined in claim 5 wherein the means for maintaining the authorized caller list comprises means for manually adding a telephone number to the list.

8. The device defined in claim 5 further comprising means for deleting the caller identification information of a currently received telephone call from the list.

9. The device defined in claim 5 wherein the means for maintaining the authorized caller list comprises means for manually deleting a telephone number from the list.

10. The device defined in claim 5 wherein the means for maintaining the authorized caller list comprises means for maintaining a list of authorized telephone numbers.

11. A method for screening incoming telephone calls on a telephone line based on an authorized caller list, comprising the steps of:
    extracting caller identification information from an incoming telephone call on the telephone line;
    comparing the caller identification information with the authorized caller list;
    allowing the incoming telephone call to ring normally when the caller identification information is contained in the authorized caller list; and
    allowing the incoming telephone call to have alternative ringing when the caller identification information is not contained in the authorized caller list.

12. The method defined in claim 11 wherein the step of allowing alternatives ringing further comprises the step of answering the incoming telephone call with answering machine circuitry.

13. The method defined in claim 11 wherein the step of allowing alternative ringing further comprises the step of generating a distinctive ring for the incoming telephone call.

14. The method defined in claim 11 wherein the step of allowing alternative ringing further comprises the step of redirecting the incoming telephone call.

15. The method defined in claim 11 further comprising the step of maintaining the authorized caller list.

16. The method defined in claim 15 wherein the step of maintaining the authorized caller list comprises the step of adding the caller identification information of a currently received telephone call to the list.

17. The method defined in claim 15 wherein the step of maintaining the authorized caller list comprises the step manually adding a telephone number to the list.

18. The method defined in claim 15 wherein the step of maintaining the authorized caller list comprises the step of deleting the caller identification information of a currently received telephone call from the list.

19. The method defined in claim 15 wherein the step of maintaining the authorized caller list comprises the step of manually deleting a telephone number from the list.

20. The method defined in claim 15 wherein the step of maintaining the authorized caller list comprises the step of maintaining a list of authorized telephone numbers.

* * * * *